Jan. 24, 1928.  
J. R. SNYDER  
1,656,925  
UNIVERSAL FITTING FOR SHOCK ABSORBERS  
Filed April 9, 1924
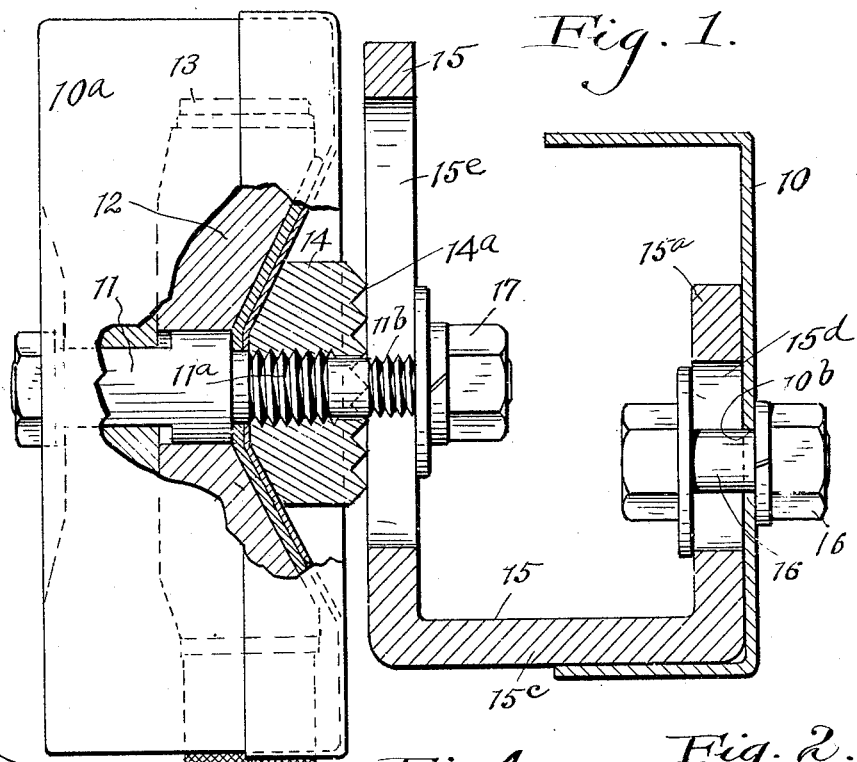
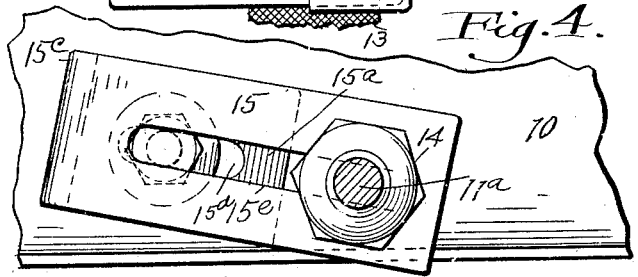
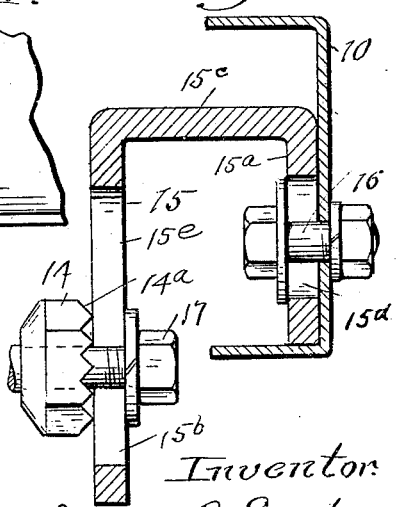
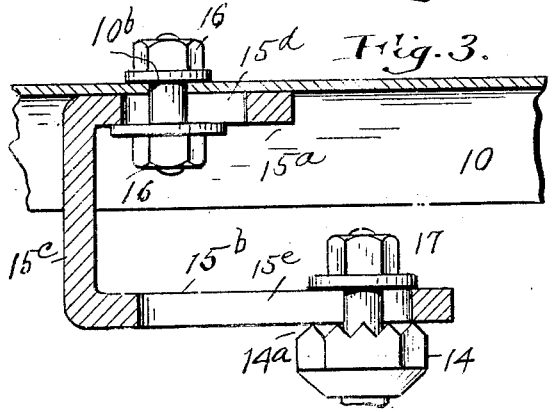
Inventor  
Jacob. R. Snyder  
Thurston Kwis & Hudson  
Attys Patented Jan. 24, 1928.

1,656,925

UNITED STATES PATENT OFFICE.

JACOB R. SNYDER, OF CLEVELAND, OHIO, ASSIGNOR TO THE STAR REBOUND CONTROLLER COMPANY, OF CLEVELAND, OHIO, A CORPORATION OF OHIO.

UNIVERSAL FITTING FOR SHOCK ABSORBERS.

Application filed April 9, 1924. Serial No. 705,178.

This invention relates to a universal fitting for shock absorbers of the rebound controlling type, and has for its object to do away with the necessity of a large number of fittings to adapt the shock absorbers to the chassis frames of different makes of cars, and to provide what may be aptly termed a universal fitting which will be suitable for practically all cars, and which can be accommodated to the varying location of the drilled holes in the chassis frames, which holes are commonly provided in the frames when the cars are constructed so as to adapt them to be equipped with shock absorbers.

In accordance with my invention I provide a fitting of such a nature that it permits the shock absorbers to be secured to the chassis frame regardless of the height or location of the openings provided therefor, and to be offset vertically or laterally with respect to the openings to clear parts of the motor vehicle.

It is a further feature of the invention that the fitting permits the shock absorber as a whole to be turned to enable the strap which is secured to the axle to extend outwardly from the casing or housing at any desired angle so as to do away with the necessity of adjusting the casing to suit any particular angle of the strap.

The invention may be briefly summarized as consisting in certain novel details of construction, and combinations and arrangements of parts which will be described in the specification and set forth in the appended claims.

In the accompanying sheet of drawings wherein I have shown the preferred embodiment of the invention, Fig. 1 is a sectional view showing a shock absorber applied to the side member of a chassis frame with the frame member and fitting in section and with a portion of the shock absorber broken away; Fig. 2 is a similar view but omitting the shock absorber and showing the parts of the fitting in a different position with respect to the frame member than illustrated in Fig. 1; Fig. 3 is a horizontal sectional view through the frame member and showing the fitting occupying still another position with respect to the chassis frame; and Fig. 4 is an inside face view of the same showing how the fitting may be inclined with respect to the chassis frame.

Referring now to the drawings, 10 represents the side member of a chassis frame, which member is as usual in the form of a channel. The two opposite side members in common automobile constructions face inwardly and they constitute the supports to which the shock absorbers are attached.

The shock absorbers with which my improved fitting is designed to be used, are of the rebound controlling type, many forms of which are in common use. They include a main or body member which is designed to be attached to the chassis frame member 10, and a strap which extends from the body member to the axle, either front or rear, these shock absorbers, as is well known, being generally supplied in sets of four, two for the rear axle and two for the front axle.

The details of the shock absorbers are immaterial to my invention, but they generally include a stationary casing, a fixed center bolt which is attached to the chassis frame member by a suitable fitting having a design, shape or size dependent upon the make of car, and a strap which is pulled into and out of the casing, i. e. coiled and uncoiled, due to relative motion between the chassis frame and axle.

In the shock absorber illustrated, the casing is shown at $10^a$, this casing and the other parts of the body portion of the shock absorber being supported by the center bolt 11 which in turn is secured to the chassis frame member 10 by the fitting to be described. In this instance, the casing encloses a drum 12, arranged to rotate about the center bolt, and adapted to have the strap 13 wound onto and unwound from it. With this construction, a spring, not shown, is adapted to turn the drum so as to wind in the strap, and the drum is turned in the reverse direction by the pull on the strap during the rebound stroke, at which time rotation of the drum is suitably resisted. Any other principle of shock absorber may, however, be employed.

Taking up now the fitting, it will be observed that it comprises two main members, to-wit, a nut 14 and a U-shaped member 15. The nut 14 is screwed onto a reduced threaded portion $11^a$ of the center bolt and is secured on the center bolt tight against the adjacent side of the casing which is here shown as inset or concaved inwardly. This nut has serrations $14^a$ formed on its outer face in order that good clamping engagement may be formed between it and the U-shaped member 15.

The U-shaped member 15 is provided with two parallel arms 15ª and 15ᵇ joined by a base portion 15ᶜ at right angles thereto. These arms are of unequal lengths, and they are provided respectively with elongated slots 15ᵈ and 15ᵉ. The shorter arm 15ª is adapted to be clamped against the inner face of the web of the channel by a bolt 16 passing through an opening 10ᵇ in the frame member 10 and through the elongated slot 15ᵈ of arm 15ª, and the relatively long arm 15ᵇ of member 15 is adapted to be clamped solidly against the serrated face 14ª of member 14 by a nut 17 screwed onto a second reduced and threaded part 11ᵇ of the center bolt, which part extends through the slot 15ᵉ of arm 15ᵇ.

It will be apparent from Fig. 1 that the slot 15ᵈ enables the fitting to accommodate various heights of the drilled opening 10ᵇ, which as before stated, is commonly provided in the chassis frame members when the car is built. Generally these holes are drilled in the chassis frame members at a height suitable for a given make of shock absorber, but this fitting by virtue of the slot 15ᵈ permits the application of other makes of shock absorbers than the particular shock absorber for which the holes were drilled.

Likewise, it will be apparent that the shock absorber can be offset vertically by moving the center bolt along the slot 15ᵉ of the long arm 15ᵇ and by clamping arm 15ᵈ to the serrated face of the nut with the shock absorber at any given height.

Furthermore, it will be seen by reference to Figs. 2 and 4, that the U-shaped member may be inverted, as shown in Fig. 2, or supported in horizontal position as shown in Fig. 3, or in inclined position as shown in Fig. 4. This adjustability in the mounting of member 15 on the chassis frame, together with the provision of elongated slots, particularly the slot 15ᵉ, and the adjustability of the center bolt along it, permit any desired vertical or lateral off-setting of the shock absorber which may be necessary to enable the strap to clear parts of the car.

Another advantage of a fitter composed of two parts such as the part 14 with its serrated face and the part 15 to be clamped to it, is that no particular or given angular relationship is required between the parts 14 and 15 for the clamping engagement, but the part 14 can be turned relative to the part 15 and the same clamping engagement obtained. This enables the shock absorber as a whole to be turned or to be given an angular adjustment so that the opening in the casing 10ª through which the strap extends can face in any direction. Obviously this permits the strap to be extended out from the casing at any desired angle without the necessity of adjusting the casing relative to the other parts of the body portion of the shock absorber.

It will be seen, therefore, that I have provided a very useful improvement in shock absorber fittings, as the latter adapt a shock absorber for practically all makes of cars, and permits it to be attached in the most effective manner, or in the best possible position, and the necessity for a large number of fittings, which heretofore have been required to adapt any make of shock absorber to different styles and makes of cars, is entirely avoided.

While I have shown only the preferred construction, I do not desire to be confined to the exact details shown, but aim in my claims to cover all modifications which do not involve a departure from the spirit and scope of my invention.

Having described my invention, I claim:

1. In combination with a shock absorber, a fitting by which it may be secured to the chassis frame of a motor vehicle, said fitting comprising a fitting member carried by the shock absorber, a second fitting member adapted to be secured to the chassis frame, said two fitting members being adapted to be clamped together, and means for securing said second fitting member to the frame in different positions of angular adjustment.

2. In combination with a shock absorber, a fitting by which it may be secured to the chassis frame of a motor vehicle, comprising a fitting member carried by the shock absorber, a second fitting member adapted to be secured to a chassis frame, said fitting members being relatively linearly adjustable, means for clamping said fitting members together, and independent means for securing said second fitting member to the frame.

3. In combination with a shock absorber, a fitting for securing the same to the chassis frame of a motor vehicle, said fitting comprising two members, one carried by the shock absorber and the other adapted to be secured to the chassis frame, said members being relatively adjustable linearly and angularly, means for clamping said members together in any given adjusted position, and independent means for securing the second mentioned member to said frame.

4. In combination with a shock absorber, a fitting for securing the same to a chassis frame and comprising two members, one carried by the shock absorber and the other adapted to be secured to the chassis frame, one of said members having a slot along which the other may be adjusted, means for clamping the two members together in any adjusted position, and independent means for securing the second mentioned member to said frame.

5. In combination with a shock absorber, a fitting for securing the same to the chassis frame and comprising a member adapted to be angularly adjusted with respect to the chassis frame, means for securing said member to the chassis frame in any adjusted position, and independent means for securing the member to the shock absorber.

6. In combination with a shock absorber, a fitting for securing the same to the chassis frame comprising a substantially U-shaped member having an arm adapted to be secured to the shock absorber and having a slotted arm adapted to be secured to the chassis frame, and separate means for securing said arms to said shock absorber and to said frame.

7. In combination with a shock absorber, a fitting for securing the same to the chassis frame comprising a member having two slotted arms, and attaching members extending through said slots for adjustably securing one of said arms to the chassis frame and the other to the shock absorber.

8. In combination with a shock absorber, a fitting for securing the same to the chassis frame comprising two members, one carried by the shock absorber and the other adapted to be secured to the chassis frame, said two members being relatively adjustable, means for securing them together in any desired relative adjusted position, and separate means for adjustably securing the second mentioned member to the chassis frame.

9. In combination with a shock absorber, a fitting for securing the same to the chassis frame and comprising two members, one carried by the shock absorber and the other adapted to be secured to the chassis frame, said two members being relatively adjustable both angularly and linearly, means for clamping said members together in any relative adjusted position, and the member which is designed to be secured to the chassis frame being adjustable angularly with respect thereto, and means independent of the first mentioned means for securing it to the chassis in any angularly adjusted position.

In testimony whereof, I hereunto affix my signature.

JACOB R. SNYDER.